Jan. 29, 1952 — O. E. ANDRUS — 2,583,804
MOTOR WINDING
Filed Jan. 21, 1948 — 2 SHEETS—SHEET 1

INVENTOR.
Orrin E. Andrus
BY
ATTORNEY.

Jan. 29, 1952 — O. E. ANDRUS — 2,583,804
MOTOR WINDING
Filed Jan. 21, 1948 — 2 SHEETS—SHEET 2

INVENTOR.
Orrin E. Andrus
BY
ATTORNEY.

Patented Jan. 29, 1952

2,583,804

UNITED STATES PATENT OFFICE 2,583,804

MOTOR WINDING

Orrin E. Andrus, Altadena, Calif., assignor to A. O. Smith Corporation, Milwaukee, Wis., a corporation of New York Application January 21, 1948, Serial No. 3,387

2 Claims. (Cl. 171—252)

This invention relates to the construction of motor windings and the like for submersion in various fluids.

Heretofore motor stator windings have been constructed with short flexible leads for connection to a source of electricity.

In attempting to adapt such windings to operation while subjected to corrosive and conductive fluids and the like it has been found necessary to apply thereto one or more coatings of an impervious electrical insulating varnish which is impregnated therein and baked at a suitable temperature. When such a varnish is applied to the insulated flexible lead wire and baked along with the varnish on the windings, the varnish coating becomes brittle and prevents flexing of the lead wire. The heat of baking also injures the insulation for the lead wire. In the event such a coated lead wire is bent the varnish cracks and also disrupts the insulation on the wire, resulting in failure or breakdown of insulation.

The principal object of the present invention is to eliminate the difficulty mentioned and to provide for flexible lead wires on windings of the type referred to.

Another object of the invention is to provide fixed terminals on the winding to which the stator terminal wires may be secured prior to the insulation of the motor unit assembly with insulating varnish or the like.

Another object is to provide an insulation seal for the lead wire.

A further object is to provide a terminal structure in which the winding conductor is relieved from any strain caused by the pull or flexing of the lead wire.

The invention is illustrated in the accompanying drawing in which.

Figure 1:
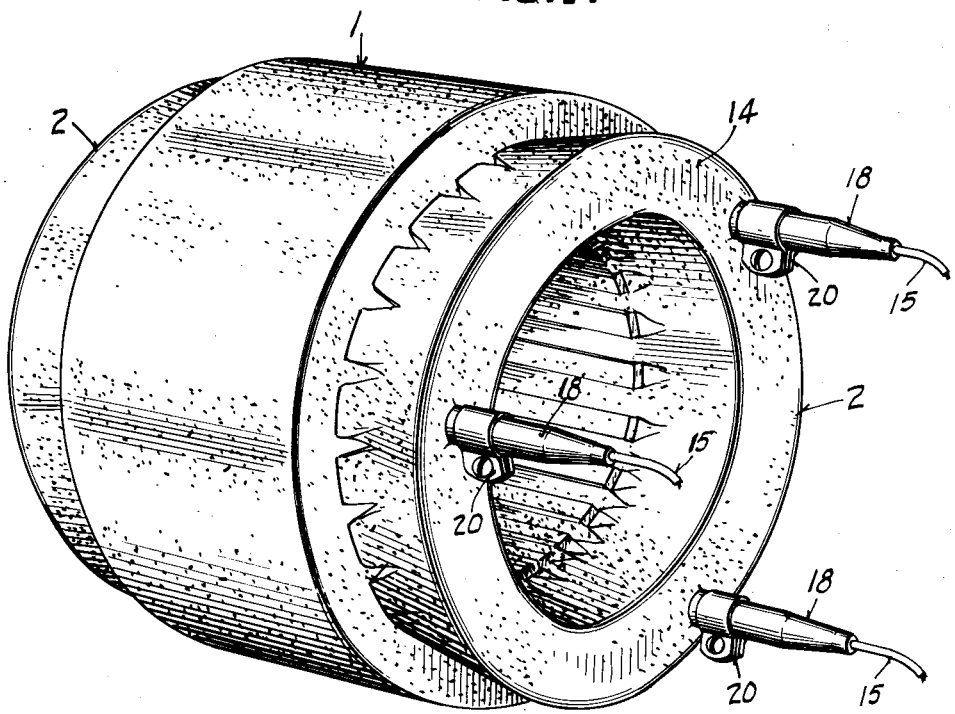
Figure 1 is a perspective view of a stator winding showing the flexible leads attached thereto.
Figure 2:
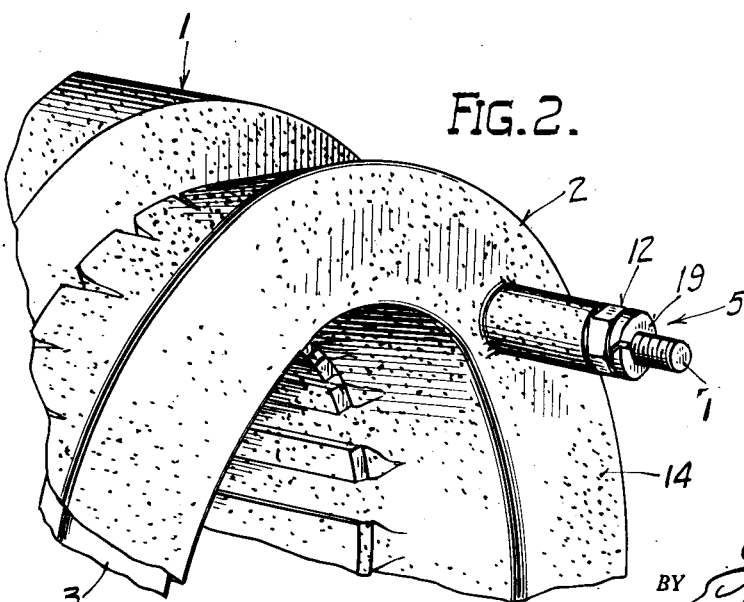
Figure 2 is a similar enlarged detail view showing one of the lead terminals prior to attachment of the lead thereto.
Figure 3:
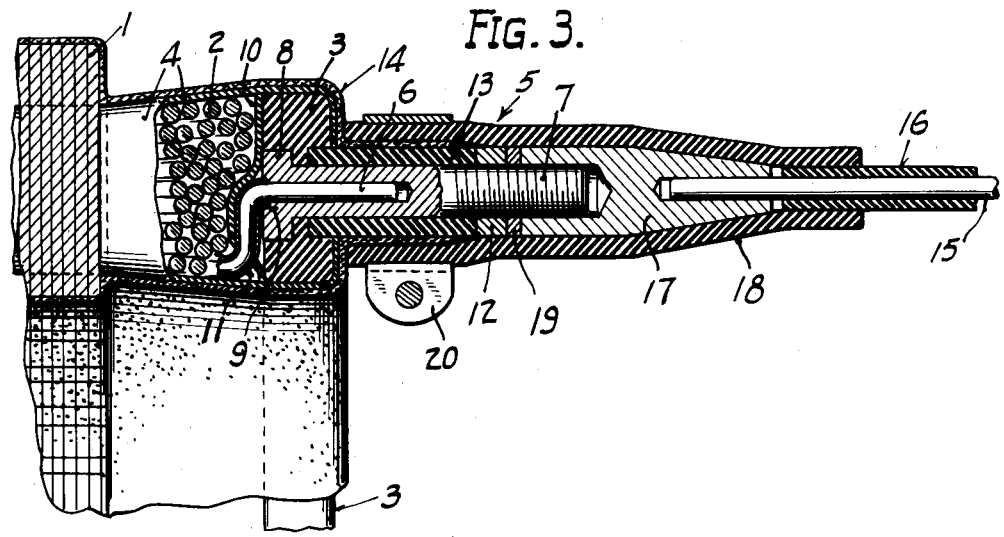
Fig. 3 is a fragmentary section taken longitudinally through a terminal of Fig. 1.
Figure 4:
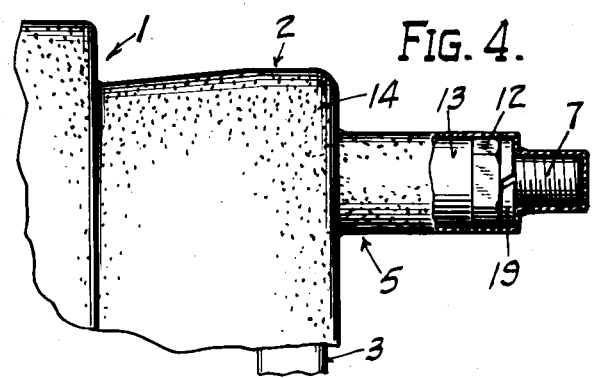
Fig. 4 is a fragmentary view, partly in section, of the stator terminal after varnish impregnation.
Figure 5:
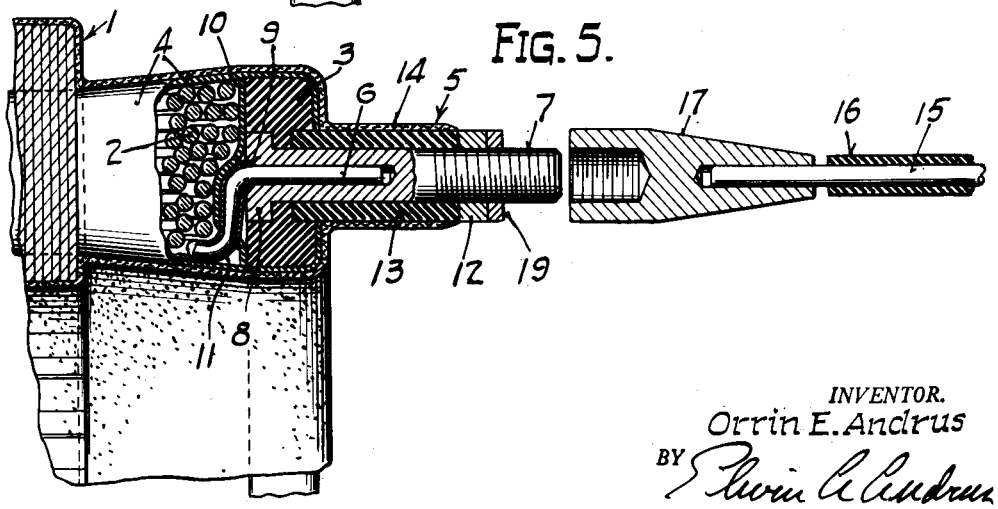
Fig. 5 is a section similar to Fig. 3 showing the terminal and flexible lead prior to assembly.

The motor stator 1 composed of suitable metal laminations has the usual winding protruding in a hollow cylindrical shape at each end to provide the end coils 2.

According to the invention one end of the stator has an anchor member 3 composed of insulating material such as fabric reinforced Bakelite, which is secured to end coil 2 of the winding by tape 4.

The anchor member 3 is preferably in the form of a continuous ring having the same diameters as the inside and outside of the end coil 2 of the winding, although it may be constituted of a segment or segments.

Anchor member 3 has a plurality of fixed lead wire terminals 5 secured thereto, one for each stator terminal wire 6. Each terminal 5 comprises a central binding post 7 of brass or other suitable conducting material with an inner head 8 fitting in a recess beneath the member 3 and to which the stator terminal wire 6 is soldered or otherwise secured as at 9. A suitable insulating sheet 10 is disposed over the wire 6 and covers the head 8. The terminal wire 6 is additionally insulated from end coils 2 before entry into binding post 7 by a sleeve 11 of woven cotton or the like. The wire 6 passes to the coil 2 through a suitable opening in insulating sheet 10.

The binding post 7 protrudes a substantial distance from the anchor member 3 and is threaded on its outer end to receive a securing nut 12. A sleeve 13 of Bakelite or other insulating material is disposed upon the binding post 7 and is held in place against anchor 3 by the nut 12. The sleeve 13 may be of any length or may be entirely eliminated.

The drawings show three separate terminals 5 equally spaced around the rim of the stator winding for a three phase alternating current induction motor. For other types of motors a different number of terminals may be employed and they may be located differently.

The varnish coating 14 extends substantially throughout the entire stator and its winding and over the sleeves 13 on the terminals and bonds the exposed portions of the stator together. A baking type varnish coating 14 is preferably employed. The varnish secures the anchor 3, tape 4 and end coils 2 together and may be applied in one or more layers. The terminals are therefore mounted rigidly upon the windings and there is no flexing of any part that would crack the coating 14 and result in insulation failure.

Each of the leads, which is adapted to connect to the terminals 5, comprises the usual conductor or lead wire cable 15 with its insulation 16, and a specially constructed metal cap 17 with a tapped hole for threading upon post 7. An outer sleeve 18 of highly insulating material extends over the nut 12, sleeve 13 and the cable insulation 16 and cap 17. A lock washer 19 is threaded on post 7 between nut 12 and the cap 17 to prevent loosening of the latter from vibration.

The conductor cable 15 extends into and is secured as by soldering to the shank of cap 17. The outer sleeve 18 preferably extends for the length of the lead wire, as well as over the terminal 5. A clamp 20 encircles the sleeve 18 to secure it tightly upon the sleeve 13 of the terminal and prevent entrance of liquid to the joint.

The sleeve 18 is preferably constructed of flexible insulating material that resists the liquids in which it is to be submerged. For this purpose natural or synthetic rubber tubing or the like has been found to be very satisfactory. Since the varnish is not applied to the cable insulation 16, the lead wires may be flexed without fear of injury thereto as would be the case were it necessary to protect the lead by varnish insulation.

In constructing the motor windings with flexible leads as described, after stator 1 is wound the end portion of the stator terminal wire 6 that will be adjacent the conductors of end coils 2 is enclosed in insulating sleeve 11.

The wire 6 is then inserted through an opening in insulation 10 and into the binding post 7, and is soldered at 9 to the post. Ring member 3 is applied and slipped onto the several binding posts 7 with the heads 8 of the latter fitting into recesses in the back of the ring and with terminals 5 protruding.

The stator lead 6 is then twisted or folded down toward the stator winding to bring the ring 3 in close position to the windings. The sheet 10 separates the ring from the conductors of the end coils to provide an effective insulation therebetween and ring 3 is secured to the end coil 2 by tape 4.

The sleeve 13 and nut 12 are then applied to secure the ring 3 in place on the posts 7.

The entire stator is then coated with the impervious electrically insulating resin or varnish 14 baked at the required temperature to make it suitable for submerged operation. The varnish 14 completely coats all conductors to prevent electrolysis and shorting. The varnish is either prevented from coating the threads on the outer end of terminal 5 or is removed following the impregnating and baking operation.

The lead wire 15 is secured to terminal 5 by threading metal cap 17 of the lead 15 onto the end of the terminal 5.

The exposed terminal 5, nut 12 and lock washer 19 are sealed from exposure to the surrounding fluid by the fluid tight sealing sleeve or tube 18 which is slipped over the terminal parts and sleeve after assembly thereof around lead wire 15. The clamp 20 is assembled around tube 18 and tightened to seal tube 18 to sleeve 13 and prevent the entrance of surrounding fluid therebetween. The tube 18 may be sealed onto insulation 16 by vulcanization or by being cemented to cap member 17.

The lead wires 15 and insulation tube 18 are readily replaceable without damaging the windings or end coils of the motor.

Various embodiments of the invention may be employed within the scope of the accompanying claims.

I claim:

1. In an electric motor, or the like, adapted to have its stator submerged in an operating fluid, a winding for the stator, an anchor member disposed at an end of the winding and secured thereto, a binding post secured to said anchor member and having a tubular insulation element extending from the anchor member over the body of the binding post for a substantial distance, and a continuous protective coating secured upon the winding and said insulation element, the outer end of said post being exposed for connection to a lead wire and said insulating element providing a body for sealing with an insulating member on the lead wire.

2. In an electric motor, or the like, adapted to have its stator submerged in an operating fluid, a winding for the stator, an anchor member disposed at an end of the winding and secured thereto, a binding post secured to said anchor member and having a tubular insulation element extending from the anchor member over the body of the binding post for a substantial distance, and a continuous protective coating secured upon the winding and said insulation element, a flexible lead wire removably secured to the outer end of said post, an insulating member on said lead wire extending over the joint and over said insulation element, and means for sealing said insulating member to said element.

ORRIN E. ANDRUS.

REFERENCES CITED

The following references are of record in the file of this patent:

UNITED STATES PATENTS

| Number | Name | Date |
| --- | --- | --- |
| 1,153,580 | Sheppy | Sept. 14, 1915 |
| 1,261,193 | Van Deventer | Apr. 2, 1918 |
| 1,277,765 | Smith | Sept. 3, 1918 |
| 1,440,952 | Apple | Jan. 2, 1923 |
| 1,792,526 | Apple | Feb. 17, 1931 |
| 1,822,261 | Apple | Sept. 8, 1931 |
| 1,925,892 | Apple | Sept. 5, 1933 |
| 2,206,672 | Pederquist | July 2, 1940 |
| 2,280,855 | Rose | Apr. 28, 1942 |
| 2,286,952 | Cannon et al. | June 16, 1942 |
| 2,291,793 | Chandler | Aug. 4, 1942 |
| 2,435,231 | Sigmund et al. | Feb. 3, 1948 |

FOREIGN PATENTS

| Number | Country | Date |
| --- | --- | --- |
| 451,776 | Great Britain | Aug. 11, 1936 |